US006085154A

United States Patent [19]

Leuthausser et al.

[11] Patent Number: 6,085,154

[45] Date of Patent: Jul. 4, 2000

[54] METHOD FOR ESTIMATING THE FAILURE RATE OF COMPONENTS OF TECHNICAL DEVICES

[75] Inventors: Ulrich Leuthausser, Grasbrunn/Harthausen; Jurgen Sellen, Munich, both of Germany

[73] Assignee: ESG Elektroniksystem- und Logistik-Gesellschaft mit beschrankter Haftung, Munich, Germany

[21] Appl. No.: 09/047,681

[22] Filed: Mar. 25, 1998

[30] Foreign Application Priority Data

Mar. 26, 1997 [DE] Germany ........................... 197 12 767

[51] Int. Cl.[7] ............................... G07C 5/00; G07C 5/08; G01B 3/44; G01B 3/52

[52] U.S. Cl. ............................ 702/34; 702/181; 702/182; 702/187; 701/29

[58] Field of Search .................................. 702/35, 81, 34, 702/113, 117, 118, 177, 179, 180, 181–187, 199, FOR 125, 135, 137, 139; 701/29, 30, 34; 705/7, 8, 10; 700/108–110, 79, 306

[56] References Cited

U.S. PATENT DOCUMENTS 4,586,147 4/1986 Tadokoro ................................ 702/184

*Primary Examiner*—Marc S. Hoff
*Assistant Examiner*—Manuel L. Barbee
*Attorney, Agent, or Firm*—Baker Botts L.L.P.

[57] ABSTRACT

In a method for estimating the failure rate λ(t) of corresponding components in a stock of technical devices such as, for example, vehicles of all kinds, where the number of components failing within a given time interval and hence having to be replaced by repair or replacement is continually established and from this a lifetime distribution f(t) of said components is determined, it is disclosed that, in a total stock varying with time according to a specific or continually ascertained stock function G(t), the lifetime distribution f(t) or the cumulative lifetime distribution F(t) be corrected by taking the stock function G(t) into account.

6 Claims, 5 Drawing Sheets

METHOD FOR ESTIMATING THE FAILURE RATE OF COMPONENTS OF TECHNICAL DEVICES

FIELD OF THE INVENTION

The invention relates to a method for estimating the failure rate λ(t) of corresponding components in a stock of technical devices such as, for example, vehicles of all kinds, where the number of components failing in a particular time interval, and therefore requiring repair or replacement, is continually established and a lifetime distribution f(t) of said components is determined.

THE PRIOR ART

As a rule, complex technical devices, such as vehicles of all kinds, generally with a great many components, are reconditioned by repair or replacement after failure of one or another component. For long-term replacement planning, it is essential to determine the failure rate λ(t) of a respective component as reliably as possible, since its integration over service time in consideration of the stock indicates the replacement requirement of the respective component. The failure rates of individual components are frequently unknown by the manufacturer, particularly when specially constructed components are used for specific purposes in the technical device. Failure rates of individual parts of components may indeed be known, but as a rule, a reliable conclusion as to the failure rate of the component itself cannot be reached for a corresponding great number of individual parts.

The failure rate λ(t) for components in question can be calculated directly or via the cumulative lifetime distribution F(t). Here, the lifetime distribution of the particular component is continually ascertained during use of the technical devices, in order to calculate from it the failure rate for prognosis of the future requirement for that component. In so doing, the procedure is to record the replacement of the component upon every failure of the technical device because of a defective component or upon every replacement of a defective component at the time of maintenance of the device, and also to make a note as to how many times the component in question has been replaced in the technical device.

From the data so obtained, the failure rate λ(t) can be directly determined from the quotients of the number of failed components and the observation period involved. But this directly calculated failure rate does not take into account the system noise of the lifetimes of individual components caused by statistical variations. A reliable prognosis of failure on the basis of a failure rate λ(t) calculated directly from the data obtained, therefore, is not possible.

In order to obtain a result that takes system noise into account and hence one that is more sharply defined and more suitable for prognosis of the failure rate λ(t), lifetime distributions f(t) are determined from the data obtained. In the following, the lifetime distribution of components having failed for the first time in the maintenance period is designated by $f_1(t)$, and the lifetime distribution of components failing for the second time is designated $f_2(t)$, etc. From the lifetime distributions so established, the failure rate λ(t) can then in principle be determined by, for example, adding up the Laplace transforms of the lifetime distributions and inverse-transforming the sum (see, for example, Cox, D. R.; Miller, H.: *The Theory of Stochastic Processes,* Methun & Co. Ltd., London).

A simple relation for the Laplace transform of the failure rate λ(s) can be derived from classic renewal theory, specifically, as the quotient of the Laplace transform $f_1(s)$ of the first lifetime distribution $f_1(t)$, divided by 1 minus the Laplace transform f(s) of one of the additional lifetime distributions f(t). However, here it is assumed that the additional lifetime distributions are all equal. It is further assumed that the stock of technical devices also does not vary. Yet these assumptions are frequently not valid.

Thus, for example, a fleet of fighter planes varies in the course of time according to a specific retirement plan. Added to this are further reductions in stock on account, for example, of accidents or repairs that are no longer worthwhile.

The invention is based on the consideration that a reduction in stock leads to fewer failures, i.e., to altered lifetime distributions. If these distributions are then made the basis for calculation of the failure rate λ(t) of the particular component, as a rule, excessively low values are obtained for the failure rate λ(t); a misleadingly greater reliability of the particular component is obtained. A prognosis of the requirement for the component on the basis of the failure rate λ(t) so determined, therefore, supplies false results.

SUMMARY OF THE INVENTION

The object of the invention is to indicate a method of the type mentioned at the beginning that takes into account a total stock of technical devices varying with time.

In accordance with the invention, this object is accomplished in that, in a total stock varying with time according to a specific or continually determined stock function G(t), the lifetime distribution f(t), or the cumulative lifetime distribution F(t), is corrected by taking the stock function G(t) into account. As mentioned above, the failure rate λ(t) follows from the measured lifetime distribution f(t), specifically according to the mathematical formalism selected in each instance, directly from the lifetime distribution f(t) or from the cumulative lifetime distribution F(t). The correction according to the invention for taking the stock function G(t) into account may be made in the lifetime distribution f(t) or in the cumulative lifetime distribution F(t).

Correction of the cumulative lifetime distribution F(t) preferably is undertaken in that the corrected cumulative lifetime distribution $F^0(t)$ is determined as a function of time in that, for an instantaneous time interval t−1 to t, a failure factor A(t) is established as the number of components having failed in the instantaneous as well as in all preceding time intervals, in that the components taken out of service in the preceding time intervals (i) due to retirement from service of the particular technical device are in each instance established according to a declining stock function G(t) and the number b(i) ascertained is multiplied by a first or second term β(i) or γ(i), which depends upon the cumulative lifetime distribution F(i) up to the particular time interval and previously determined, and the products so ascertained for all preceding time intervals (i=1 to t−1) are added to obtain a first or second correction factor B(t) or C(t), and in that the cumulative lifetime distribution $F^0(t)$ is determined from the quotient of the difference between the failure factor A(t) and the first correction factor B(t), divided by 1 minus the second correction factor C(t), so that the following relation applies:

$$F^0(t) = \frac{A(t) - B(t)}{1 - C(t)}$$

with

-continued $$A(t)=\sum_{i=1}^{t-1} a(i),$$

$$B(t)=\sum_{i=1}^{t-1} b(i)\cdot\beta(i),$$

$$\text{and } C(t)=\sum_{i=1}^{t-1} b(i)\cdot\gamma(i)$$

It is proposed here that the first term β(i) be the quotient of the cumulative lifetime distribution F(i) up to the particular time interval divided by 1 minus this lifetime distribution F(i), and that the second term γ(i) be the quotient of 1 divided by 1 minus this lifetime distribution F(i), i.e., $$\beta(i)=\frac{F(i)}{1-F(i)} \text{ and } \gamma(i)=\frac{1}{1-F(i)}$$

This allows the influence of the varying stock function G(t) on the cumulative lifetime distribution F(t) to be taken into account in simple fashion. The corrected lifetime distribution $f^0(t)$ can be determined by differentiation with time of the corrected cumulative lifetime distribution $F^0(t)$. From this is obtained the failure rate λ(t) by, for example, numerical solution of the following integral equation:

$$\lambda(t)=f_1^0(t)+\int_0^t \lambda(t-u)\cdot f^0(u)du,$$

where u is the integration variable, $f_1(t)$ the first lifetime distribution and f(u) (and f(t)) the second, third, etc. lifetime distribution.

As already mentioned, classic renewal theory assumes that lifetime distributions of a component, i.e., the first, the second, etc. lifetime distribution, do not differ from one another. However, in many practical cases this assumption is not valid. One possible cause of this is that the failed component is not replaced by a brand-new component each time, but by a reconditioned component such as, for example, a replacement engine. Accordingly, such a reconditioned component has a great number of non-reconditioned, i.e., older, parts, as well as one or more new parts. Because of the proportion of older parts, the average lifetime of these replacement components will in general be shorter than those of a brand-new component. However, it is alternatively possible for the lifetime of a replacement component to be greater than that of a brand-new one because, for example, a part less susceptible to trouble has been used in the replacement component than in the brand-new component.

According to another aspect of the invention, which is itself independent of the preceding aspect of taking the stock function into account, but advantageously is capable of realization in conjunction with it, the invention concerns a method for estimating the failure rate λ(t) of corresponding components in a stock of technical devices, such as, for example, vehicles of all kinds, where after a first replacement of the failed components by repair or replacement and after at least a second replacement, the number of components failing in a particular time interval is continually established and from that a first and at least a second lifetime distribution $f_1(t)$, $f_2(t)$ of the components is determined.

For taking varying lifetime distributions into account, it is proposed that the Laplace transform failure rate λ(s) be approximated according to the following relation:

$$\lambda(s)=f_1(s)\sum_{i=1}^{\infty}\left(\exp\left(-s\sum_{j=2}^{i}\mu_j+\frac{1}{2}s^2\sum_{j=2}^{i}\sigma_j^2\right)\right)$$

where $f_1(s)$ is the Laplace transform of the first lifetime distribution $f_1(t)$, $\mu_j$ the first moment of the j-th lifetime distribution $f_j(t)$, $\sigma_j$ the second moment of the j-th lifetime distribution $f_j(t)$ and s the Laplace variable, and in that the failure rate λ(t) be calculated by Laplace inverse transformation.

Therefore, at least for comparatively great service times (i.e., in general $t \geqq \mu$), the Laplace transform failure rate λ(s), as a simple sum via the Laplace variable s, as well as the terms containing the first and second moments of the lifetime distributions, can be calculated fairly exactly, and from that, the failure rate λ(t) itself can be determined by Laplace inverse transformation.

For cases in which the difference Δμ between first moments of successive lifetime distributions, as well as the difference $\Delta\sigma^2$ between the squares of second moments of successive lifetime distributions, is essentially constant (i.e., the first moments $\mu_j$ and the squares of the second moments $\sigma_j$ of lifetime distributions vary approximately linearly with time), the failure rate λ(t) can be calculated directly in simple fashion by approximating the failure rate λ(t) according to the following relation:

$$\lambda(t)\cong\frac{1}{\mu}+\frac{\Delta\mu}{\mu^3}\cdot t-\frac{\Delta\mu}{\mu^2}\left(\frac{\mu_1}{\mu}-\frac{3}{2}\left(1+\frac{\sigma^2}{\mu^2}\right)\right)+\frac{\Delta\sigma^2}{2\mu^3},$$

where $\mu_1$ is the first moment of the first lifetime distribution $f_1(t)$, μ is the first moment of an additional, advantageously the second, lifetime distribution $f_2(t)$, Δμ is the difference between the first moments $\mu_2$ and $\mu_3$ of two successive, advantageously the second and third, lifetime distributions $f_2(t)$ and $f_3(t)$, σ is the second moment of the additional lifetime distribution $f_2(t)$ and $\sigma^2$ is the difference between the squares of two second moments $\sigma_2$ and $\sigma_3$ of two successive lifetime distributions $f_2(t)$ and $f_3(t)$.

BRIEF DESCRIPTION OF THE DRAWINGS

The invention is explained below by preferred examples with the aid of the drawings, wherein.

Figure 1:
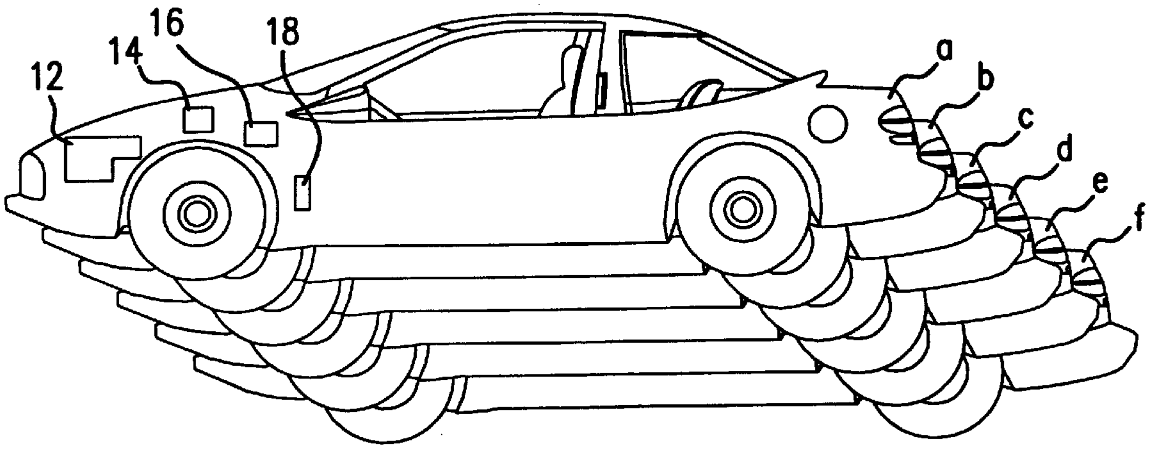
FIG. 1 shows, schematically, a stock of technical devices in the form of vehicles having a plurality of components.

A stock of technical devices in the form of six vehicles a to f which are composed of a plurality of schematically represented components 12, 14, 16, 18 such as, for example, an engine, a brake system, a battery, a steering mechanism or the like, is represented in FIG. 1. Every vehicle of the stock is constructed the same and thus is in each instance composed of the same components as the other vehicles of the stock. In turn, the individual components are composed of parts which upon failure of one of the components 12, 14, 16, 18 can be individually replaced for repair of the component.

The vehicles a to f of the stock are monitored regarding their failure behavior, i.e., with regard to failures occurring in individual components and repairs and/or installation of a new component, and failures that have occurred are documented.

The failure data so obtained can then be analyzed by means of the method according to the invention.

Figure 2A:
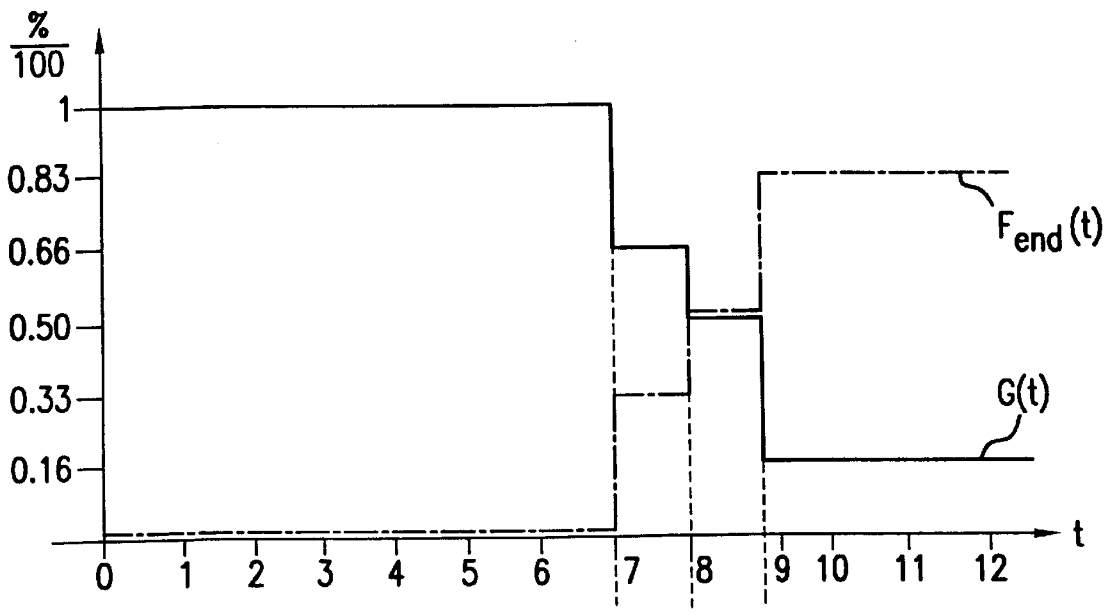
FIG. 2, in its upper part, labelled a, depicts a cumulative retirement curve $F_{end}(t)$ and a stock curve G(t) plotted over time, and, in its lower part, labelled b, failures of a given like component S in the technical devices a to f plotted over time and taking into account the stock curve G(t) in FIG. 2*a;*

A stock function G(t) represented in FIG. 2*a* can be taken into account in such analysis. The stock function G(t) indicates the total stock of vehicles (i.e., the number of vehicles in service) referred to the initial stock as a function of service time t. The course of the stock function G(t) may, on the one hand, be determined in that vehicles are taken out of service on the basis of a specific retirement curve and therefore further observation of the failure behavior of the components in such a vehicle is no longer possible or, on the other hand, in that the vehicle fails due to an accident or the like and is no longer repaired. In this second case, observation of individual system components is also discontinued.

In addition, FIG. 2*a* shows the cumulative lifetime distribution $F_{end}(t)$ of the vehicles, which indicates the number of vehicles taken out of service referred to the vehicles a to f initially placed in service and which correlates with the stock function G(t) according to the following relation:

$$G(t) = 1 - F_{end}(t). \tag{1}$$

Figure 2B:
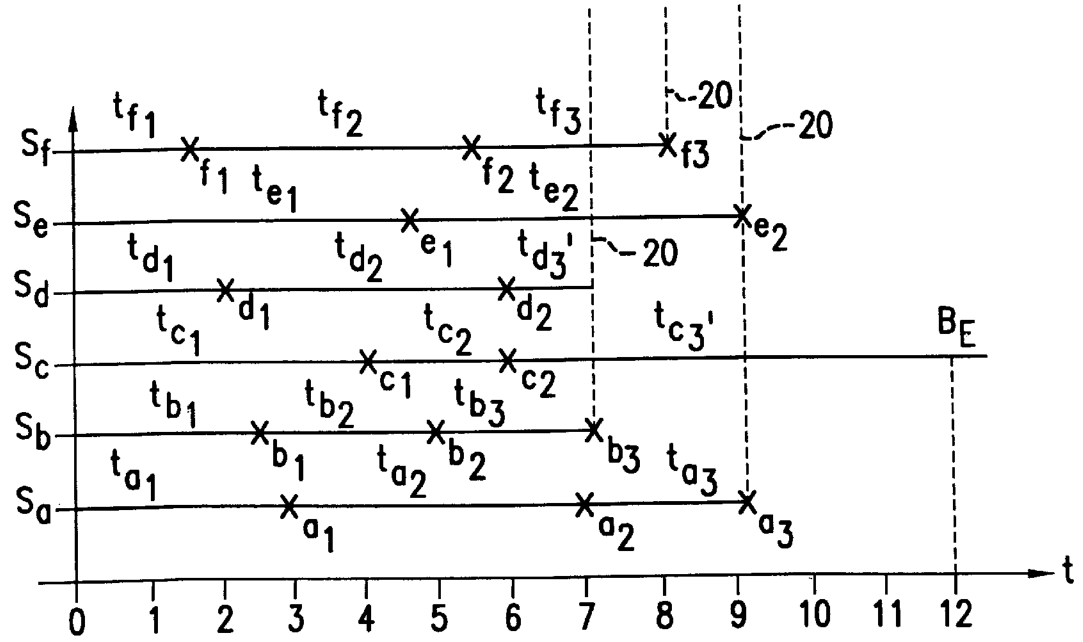

In FIG. 2*b*, the accumulated failure data of the same component S (for example, an engine) in each instance in the vehicles a to f are in each instance represented graphically on a time axis. If, for example, the component $S_a$ of the vehicle a is considered, it can be seen that a first failure $a_1$ of the component $S_a$ took place after a time $t_{a1}$ from the observation starting time (t=0). After this failure, the component $S_a$ was replaced by a brand-new or reconditioned component, and the vehicle a was put back into service. After an additional time period $t_{a2}$ second failure of the component S occurred in the vehicle a, as indicated by the point $a_2$. The component was thereupon again replaced by a brand-new or reconditioned component S and the vehicle put back into service. Following an additional time period $t_{a3}$ after having been put back into service again, the component S in the vehicle a failed a third time, as indicated by the point $a_3$. At this time, the vehicle a was finally retired.

The failure data of the component S in the vehicles b to f are represented on the same principle, where special attention is to be given to the components $S_c$ and $S_d$ of the vehicles c, d. In both vehicles, the last observation period $t_{c3}'$ and $t_{d3}'$ does not end with failure of the component $S_c$ or $S_d$. The observed component $S_c$ or $S_d$ is still functional, i.e., has not failed, at the end of observation (retirement in the case of vehicle d, observation period end $B_E$ in the case of vehicle c) and, for estimating a failure rate $\lambda(t)$, should therefore not be treated as a component failure without corresponding correction (see below), since this would falsify the result.

A direct relationship between FIGS. 2*a* and 2*b* is represented by broken lines 20. For example, at time t=7 the vehicles b and d are taken out of service, so that the stock curve falls correspondingly. At time t=8 the vehicle f is retired, so that the stock curve falls further, and so on.

Figure 3:
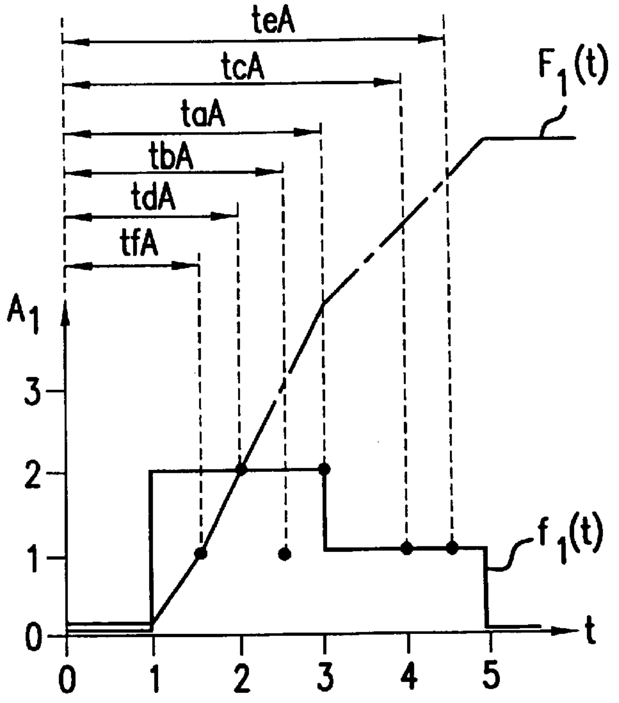
FIG. 3 is a histogram of the lifetime distribution $f_1(t)$ up to the first failure of the component S in the technical devices a to f according to the failure behavior of FIG. 2*b,* as well as the cumulative lifetime distribution $F_1(t)$ plotted over time.
Figure 4:
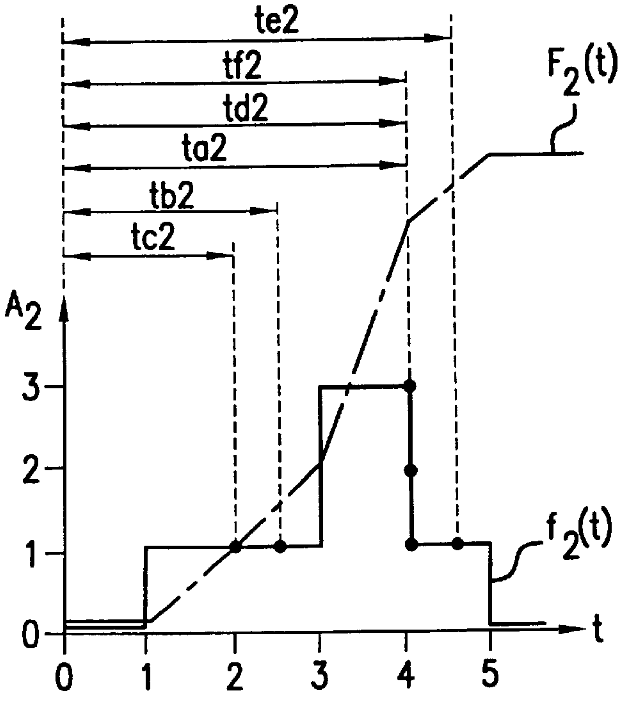
FIG. 4 is a histogram of the lifetime distribution $f_2(t)$ up to the second failure, as well as the cumulative lifetime distribution $F_2(t)$ plotted over time.
Figure 5:
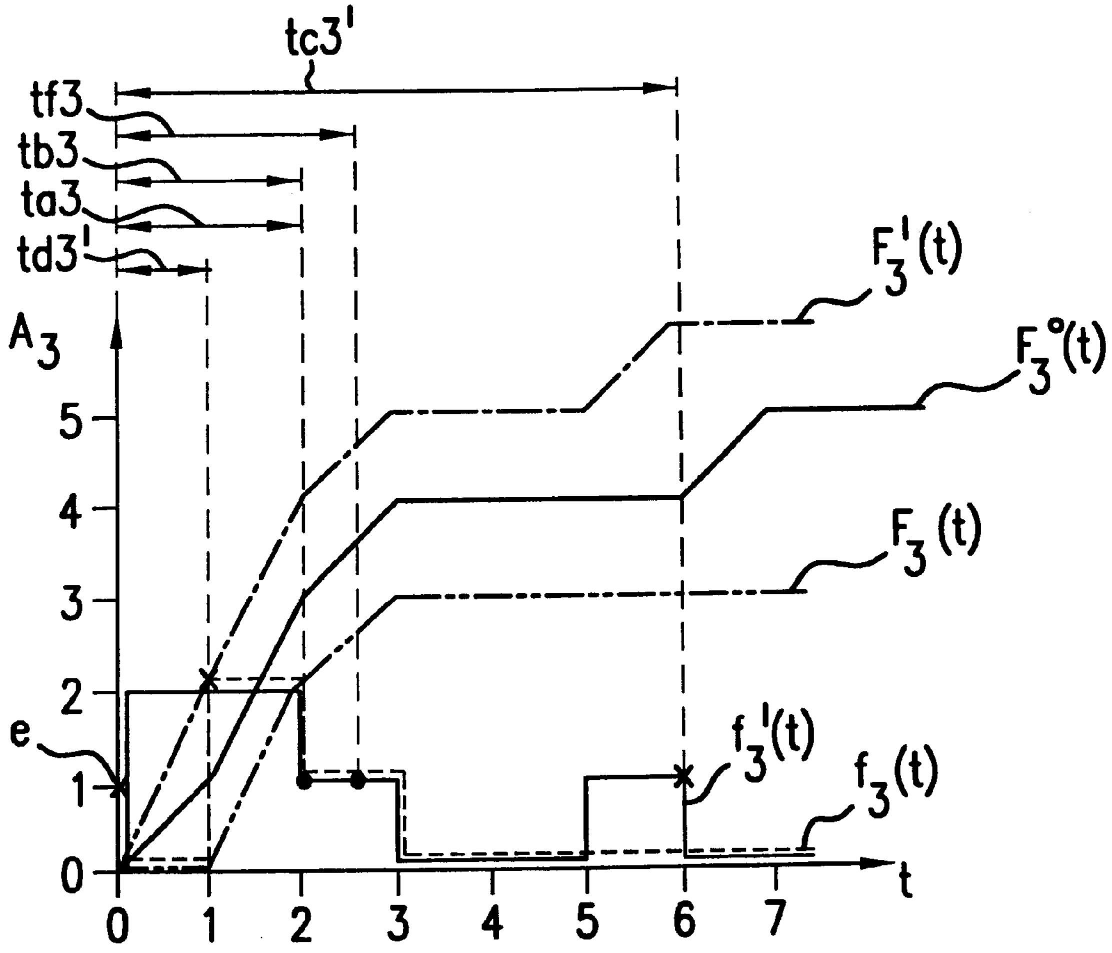
FIG. 5 is a histogram of the lifetime distribution $f_3(t)$ up to the third failure, as well as the cumulative lifetime distribution $F_3(t)$, over time, and the actual lifetime distribution $F_3^0(t)$, as well as the upper limit therefor $F_3^1(t)$, over time.

The failure data of the component S of the vehicles a to f represented in FIG. 2*b* by way of illustration can now be used for determination of lifetime distributions $f_i(t)$ for the i-th failure of the component S, as shown in FIGS. 3 to 5 for the first, second and third failures of the component.

The first failures (subscript 1) of the component S in the vehicles a to f are represented in FIG. 3 as a histogram, which forms the lifetime distribution $f_1(t)$. Each failure is marked by a dot and the associated time interval from start of observation up to failure is indicated by the use of a dimensioning arrow (at the top in FIG. 3). The failures that have in each instance occurred per time step of the t-axis are added up; the sum gives the height of the step. For example, in the period between t=1 and t=2 the system components $S_f$ and $S_d$ fail for the first time since the start of observation (t=0), so that the histogram for this time interval indicates a failure factor $A_1$(=height of step) of 2. Failures falling at one end of a time step are assigned to that time step. Accordingly, the failure $d_1$ is the second failure in the period between t=1 and t=2. The lifetime distribution $f_1(t)$ thus represents the stochastic distribution of the lifetimes of the components $S_a$ to $S_f$ for the first failure since the start of observation (t=0).

In the lifetime distribution $f_1(t)$ up to the first failure, it may happen that the start of observation does not coincide with the time that the component S is first put into service. So even vehicles delivered "brand-new" already have a certain service time (e.g., test-run time) behind them. Thus, the life time distribution $f_1(t)$ obtained does not have the course of the fundamentally desired lifetime distribution with the start of observation from first placement in service. In order not to lose the information contained in $f_1(t)$ and permit early prognosis for the component requirement, the method described below takes the lifetime distribution $f_1(t)$ into account as well.

Accordingly, the lifetime distribution $f_2(t)$ measured from the first failure up to the second failure of the components $S_a$ to $S_f$ (see FIG. 4) is the first complete lifetime distribution.

In addition, for $f_1(t)$ FIG. 3 shows a cumulative lifetime distribution $F_1(t)$ up to the first failure. This describes the probability that a component S of the vehicles a to f will fail by the time t.

Between the i-th lifetime distribution $f_i(t)$ and the associated i-th cumulative lifetime distribution $F_i(t)$, the relation $$F_i(t) = \int_0^t f_i(x)\,dx \text{ or } f_i(t) = \frac{dF_i(t)}{dt} \tag{2}$$

generally applies.

FIG. 4 shows a graph corresponding to FIG. 3 for the failures $a_2$ to $f_2$, i.e., for each second failure of the component S in each vehicle a to f since the vehicle was put back into service after the first failure of the component S. The respective lifetimes $t_{a2}$ to $t_{f2}$ are therefore the service times of the respective vehicles a to f from the time of being put back into service after the first failure of the component S up to the second failure of the component S. Corresponding to FIG. 3, the lifetime distribution $f_2(t)$ up to the second failure and a cumulative lifetime distribution $F_2(t)$, derived according to Equation (2), is plotted over time. It should be noted that, according to FIGS. 2*a* and 2*b*, all vehicles a to f are in service up to the second failure of the component S, i.e., that the component S failed twice in each vehicle before one of the vehicles a to f was retired.

FIG. 5 shows a lifetime distribution $f_3(t)$ (broken line) and a cumulative lifetime distribution $F_3(t)$ derived from it for failures of the component S in the vehicles a, b and f. It should be recognized that the components S of the vehicles c, d and e do not contribute to the lifetime distribution $f_3(t)$ and the cumulative lifetime distribution $F_3(t)$, since in these vehicles the component S does not fail a third time. After the second failure of the component S and its corresponding repair, vehicle c is in service over and beyond the observation period without further failure of the component S. Vehicle d, with intact component S, is retired during the observation period. Vehicle d is retired immediately after the second failure of the component S.

Since only the components ($S_a$, $S_b$, $S_f$) which have failed for the third time in the observation period in the vehicle concerned are taken into account for determination of the lifetime distribution $f_3(t)$ and the cumulative lifetime distribution $F_3(t)$ derived from it, but the components ($S_c$, $S_d$, $S_e$) retired with the vehicles concerned are left out of consideration for these lifetime distributions, the cumulative lifetime distribution $F_3(t)$ obtained lies below an actual lifetime distribution $F_3^0(t)$. Here actual lifetime distribution $F^0(t)$ is to be understood as that lifetime distribution which is obtained for the same stock of devices over the observation period. Since the cumulative lifetime distribution $F_3(t)$ takes into account only the failures that have taken place in a decreasing stock, it forms the lower limit for the actual lifetime distribution $F_3^0(t)$. Determination of the failure rate $\lambda(t)$ on the basis of the cumulative lifetime distribution $F_3(t)$ would result in too low a failure rate $\lambda(t)$, since the failures to be expected in retired components are not taken into consideration.

An upper limit for the actual cumulative lifetime distribution $F_3^0(t)$ is obtained when the components ($S_c$, $S_d$, $S_e$) that did not fail in the observation period, but were retired, are in each instance taken into account in determination of the lifetime distribution as if they had failed by the time of their being taken out of service according to the retirement curve $F_{end}(t)$ or at the end of the observation period $B_E$ (points marked with crosses). Hence, the actual cumulative lifetime distribution $F_3^0(t)$ varies between the lower limit $F_3(t)$ and the upper limit $F_3'(t)$, as indicated by way of example in FIG. 5.

This can be determined by means of the following estimation formula:

$$F^0(t) = \frac{A(t) - B(t)}{1 - C(t)} \tag{3}$$

where $$A(t) = \sum_{i=1}^{t} a(i), \tag{4}$$

$$B(t) = \sum_{i=1}^{t-1} b(i) \cdot \beta(i), \tag{5}$$

$$C(t) = \sum_{i=1}^{t-1} b(i) \cdot \gamma(i) \tag{6}$$

where, A(t) is the number of all components that have failed up to the time t, B(t) is a first correction factor into which enter the ascertained number b(i) of components taken out of service in the time interval i and a first term $\beta(i)$, and C(t) is a second correction factor into which enter the number b(i) of components taken out of service in the time interval i and a second term $\gamma(i)$.

The following relations apply for $\beta(i)$ and $\gamma(i)$:

$$\beta(i) = \frac{F(i)}{1 - F(i)} \tag{7}$$

and $$\gamma(i) = \frac{1}{1 - F(i)} \tag{8}$$

Overall, therefore, the following applies:

$$F^0(t) = \frac{\sum_{i=1}^{t} a(i) - \sum_{i=1}^{t-1} b(i) \cdot \frac{F(i)}{1 - F(i)}}{1 - \sum_{i=1}^{t-1} b(i) \cdot \frac{1}{1 - F(i)}} \tag{3'}$$

The abovementioned relation (Equation 2) between $f_i(t)$ and $F_i(t)$ applies for the calculation of $f^0(t)$ from $F^0(t)$.

If the ascertained lifetime distributions (optionally, corrected lifetime distributions) of individual failures are compared with one another, in principle two cases may occur:

In the first case, with increasing service time of the technical device the lifetime distributions of the observed component have essentially the same course, i.e., they are invariant. In this connection, if we go back to the example initially mentioned of the component S in the vehicles a to f, this case can be explained in that, after a failure, the component S, for example an engine, is in each instance replaced by a brand-new component S, i.e., by a brand-new engine. It is to be expected that in this case the average lifetime of the new component S will correspond to that of the failed component S. For this first case of invariant lifetime distributions, a failure rate $\lambda(t)$ for the observed component, for example S, in a stock of technical devices, such as in, for example, the vehicles a to f, can be determined by taking the falling stock function G(t) into account. The following relation exists between the failure rate $\lambda(t)$ and the corrected lifetime distributions $f_1^0(t)$, $f_2^0(t)$, etc., generally $f_i^0(t)$, derived in accordance with time by differentiation of the ascertained corrected cumulative lifetime distributions $F_i^0(t)$:

$$\lambda(t)=f_1^0(t)+\int_0^t \lambda(t-u)\cdot f^0(u)\,du \tag{9}$$

where u is the integration variable and $f_2^0(t)=f_3^0(t)=\ldots f_i^0(t)$ and $i\geqq 2$.

Accordingly, the failure rates λ(t) expected in the future for a great number of observed components can be estimated on the basis of ascertained failure data by taking the stock function into account by, for example, numerical solution of Equation 9.

By integration of the failure rate λ(t) over time, a number M(t) of failures to be expected for a period $\Delta t=t_2-t_1$, which can serve as a basis for the determination of replacement parts required in the future, can be calculated according to the following equation:

$$M(t)=\int_0^t \lambda(x)\,dx \tag{10}$$

In the second case, the lifetime distributions of the observed component S vary with increasing service time of the technical devices. Such variant lifetime distributions may occur when, for example, after a failure the observed component S is not replaced by a like brand-new component, but only one or more defective parts are replaced and the component S, thus re-conditioned with replacement parts, is put back into service. This means that the component S is composed of brand-new parts and previously used parts. Such a reconditioned component S often has a lifetime distribution differing greatly from that of a brand-new component.

In the example of the engine, this means that the failed engine is replaced by a reconditioned replacement engine, which already has a certain service time behind it and which was repaired after a failure by replacement of the failed part. In this case, it is to be expected that the reconditioned replacement engine will have an average lifetime different from that of the brand-new engine.

Figure 6:
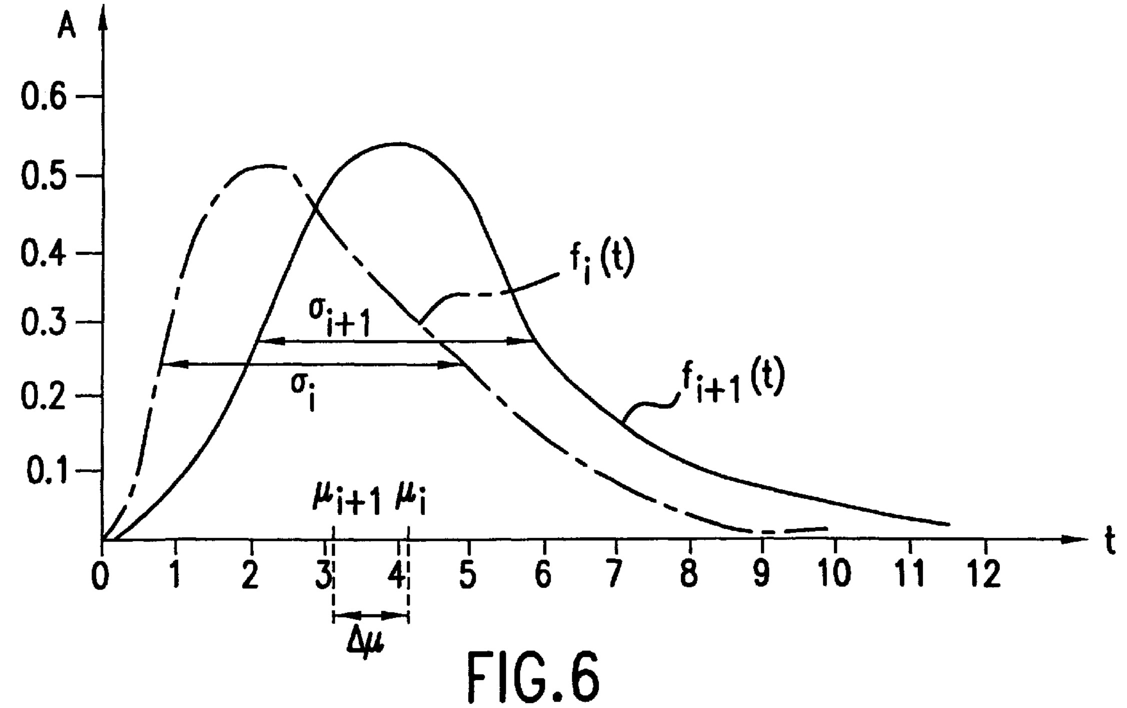
FIG. 6 is a graph of a lifetime distribution $f_i(t)$ and its first moment $\mu_i$, as well as of a lifetime distribution $f_{i+1}(t)$ differing from it and characterizing the renewal process directly following it and its first moment $\mu_{i+1}$.

With an increasing number of failures, a decline may occur in, for example, the average lifetime of the component, since the parts of the component "age," i.e., with increasing service time the number of brand-new parts of the component declines. However, the average lifetime of components may also increase with time if, after their failure, parts susceptible to trouble are gradually replaced by sturdier parts. Such an increase in average lifetime and hence a variation in two successive life-time distributions $f_i(t)$ and $f_{i+1}(t)$ is represented in FIG. 6. To illustrate the variation in two successive lifetime distributions, the first moments $\mu_i$ and $\mu_{i+1}$ of the two distributions represented are plotted on the t-axis. In addition, the difference $\Delta\mu$ between the two moments $\mu_j$ and $\mu_{i+1}$ is represented by means of a dimensioning arrow. The two moments $\sigma_i$ and $\sigma_{i+}$are also plotted approximately.

In order to take into account the effect of varying lifetime distributions caused by the use of reconditioned components in estimating the failure rate λ(t) 5 to be expected, as explained above the first lifetime distribution $f_1(t)$, i.e., the lifetime distribution of the observed component up to the first failure, possibly falsified due to the observation starting time, and at least a second lifetime distribution, advantageously the lifetime distribution of the observed component up to the second failure $f_2(t)$, are determined. Then, the first lifetime to distribution $f_1(t)$ is transformed into the Laplace form, so that it is obtained as a function of the Laplace variable s. In addition, the first moment and the second moment of the existing lifetime distribution $f_2(t)$ and optionally additional lifetime distributions $f_3(t)$, etc. are determined in each instance. With the magnitudes so determined, the failure rate λ(s) can be generally approximated in the Laplace form for a great t (i.e., in general $t\geqq\mu_j$) according to the following equation.

$$\lambda(s)=f_1(s)\sum_{i=1}^{\infty}\left(\exp\left(-s\sum_{j=2}^{i}\mu_j+\frac{1}{2}s^2\sum_{j=2}^{i}\sigma_j^2\right)\right) \tag{11}$$

where j is the subscript of the respective lifetime distribution. The failure rate λ(t) is obtained by Laplace inverse trans-formation.

Figure 7:
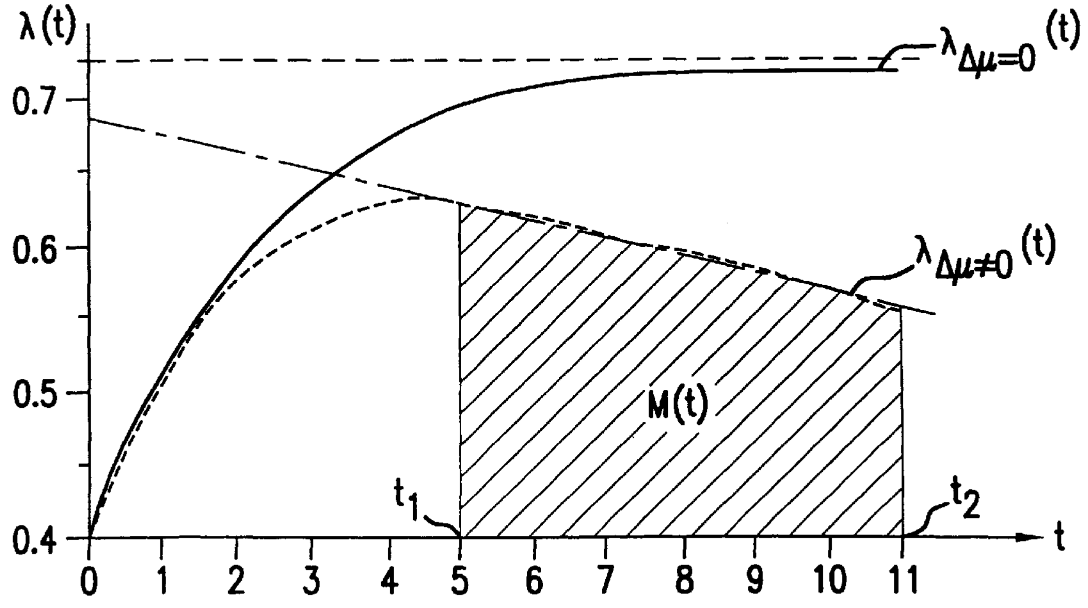
FIG. 7 is a graph of a failure rate $\lambda_{\Delta\sigma=0}(t)$ at constant lifetime distributions $f_1(t)=f_{i+1}(t)$ (solid line), as well as a failure rate $\lambda_{\Delta\mu\neq 0}(t)$ at nonconstant lifetime distributions $f_1(t)\neq f_{i+1}(t)$ (dotted line), as well as an asymptote $\lambda_A(t)$ (dot-dash line).

FIG. 7 shows the course of a failure rate $\lambda_{\Delta\mu=0}(t)$ in invariant, i.e., constant, lifetime distributions. Particularly for great times, it is found that this failure rate approaches a limit asymptotically which in this example is around 0.75, and which is indicated by a broken line, for which the following relation applies:

$$\lim_{t\to\infty}\lambda=\frac{1}{\mu} \tag{12}$$

In addition, FIG. 7 shows the course of another failure rate $\lambda_{\Delta\mu\neq 0}(t)$ which is typical for the variant lifetime distributions $f_i(t)$ and $f_{i+1}(t)$ represented in FIG. 7. It should be recognized that the function for great times (t>5) takes an approximately linear course. On the assumption that the first moments $\mu$ and the squares of the second moments σ of the varying lifetime distributions vary linearly with the subscript i of the lifetime distributions $f_i^0(t)$, i.e., $$\mu_i=\mu-\Delta\mu\cdot i \text{ and } \sigma_i^2=\sigma^2-\Delta\sigma^2\cdot i$$

it may be approximated by the broken line $\lambda_A(t)$. This line may be described by the following equation:

$$\lambda(t)\cong\frac{1}{\mu}+\frac{\Delta\mu}{\mu^3}\cdot t-\frac{\Delta\mu}{\mu^2}\left(\frac{\mu_1}{\mu}-\frac{3}{2}\left(1+\frac{\sigma^2}{\mu^2}\right)\right)+\frac{\Delta\sigma^2}{2\mu^3} \tag{13}$$

where $\mu_1$ is the first moment of the first lifetime distribution $f_1(t)$, $\mu$ is the first moment of an additional, advantageously the second, lifetime distribution $f_2(t)$, $\Delta\mu$ is the (constant) difference between the first moments $\mu_1$ and $\mu_{i+1}$ of two successive, advantageously the second and third, lifetime distributions $f_2(t)$ and $f_3(t)$, σ is the second moment of the additional, advantageously the second, lifetime distribution $f_2(t)$ and $\Delta\sigma^2$ is the (constant) difference between the squares of two second moments, advantageously $\sigma_2$ and $\sigma_3$, of two successive lifetime distributions $f_2(t)$ and $f_3(t)$.

The failure rate λ(t) for great times can therefore be determined in simple fashion by this approximation formula.

Generally, the number of failures M(Δt) to be expected in the provided time interval $\Delta t=t_2-t_1$ can be determined by integration of the failure rate λ(t) over time according to the relation mentioned above (Equation 10). This is indicated in FIG. 7 by a trapezoidal area M(t), which indicates the number of failures between the times $t_1=5$ and $t_2=11$.

With a prognosis on the basis of the failure rate λ(t) to be expected for the component of interest in a stock of technical devices such as, for example, a fleet of vehicles or a military aircraft squadron, stockkeeping for required replacement parts can be optimized, i.e., with a sufficiently great stock, stock shortages or stock excesses are virtually eliminated.

What is claimed is:

1. A method for estimating the failure rate $\lambda(t)$ of corresponding components in a total stock of technical devices, which varies with time, comprising the steps of:

continually establishing the number of components failing in a particular time interval which require replacement;

determining a lifetime distribution f(t) or cumulative lifetime distribution F(t) of said components;

determining a specific or continually determined stock function G(t) which represents the variation in the total stock of said devices with time; and correcting said lifetime distribution f(t) or said cumulative lifetime distribution F(t) by taking the stock function G(t) into account in determining a corrected lifetime distribution $f^0(t)$ or a corrected cumulative lifetime distribution $F^0(t)$.

2. The method of claim 1, wherein the corrected cumulative lifetime distribution $F^0(t)$ is determined as a function of time by (1) for an instantaneous time interval t−1 to t, establishing a failure factor A(t) as the number of components having failed in the instantaneous as well as in all preceding time intervals, (2) establishing the number b(i) of components taken out of service in the preceding time intervals (i) due to retirement from service of the particular technical device according to said stock function G(t); (3) multiplying said number b(i) by a first or second term $\beta(i)$ or $\gamma(i)$, respectively, which depends upon the cumulative lifetime distribution F(i) up to the particular time interval and previously determined, (4) adding the products so ascertained for all preceding time intervals (i=1 to t−1) to obtain a first or second correction factor B(t) or C(t), and (5) determining the cumulative lifetime distribution $F^0(t)$ from the quotient of the difference between the failure factor A(t) and the first correction factor B(t), divided by 1 minus the second correction factor C(t), so that the following relation applies:

$$F^0(t) = \frac{A(t) - B(t)}{1 - C(t)}$$

with $$A(t) = \sum_{i=1}^{t} a(i),\ B(t) = \sum_{i=1}^{t-1} b(i)\cdot\beta(i),\ C(t) = \sum_{i=1}^{t-1} b(i)\cdot\gamma(i).$$

3. The method of claim 2, wherein the first term $\beta(i)$ is the quotient of the cumulative lifetime distribution F(i) up to the particular time interval divided by 1 minus said lifetime distribution F(i), and the second term $\gamma(i)$ is the quotient of 1 divided by 1 minus said lifetime distribution F(i), such that:

$$\beta(i) = \frac{F(i)}{1 - F(i)} \text{ and } \gamma(i) = \frac{1}{1 - F(i)}.$$

4. A method for estimating the failure rate $\lambda(t)$ of corresponding components in a total stock of technical devices, comprising the steps of:

continually establishing, after a first replacement of failed components by repair or replacement and after at least a second replacement, the number of components failing in a particular time interval;

determining from said continually established number a first and at least a second lifetime distribution $f_1(t)$, $f_2(t)$ of said components; and determining the Laplace transform failure rate $\lambda(s)$ for said components according to the following relation:

$$\lambda(s) = f_1(s)\sum_{i=1}^{\infty}\left(\exp\left(-s\sum_{j=2}^{i}\mu_j + \frac{1}{2}s^2\sum_{j=2}^{i}\sigma_j^2\right)\right)$$

where $f_1(s)$ is the Laplace transform of the first lifetime distribution $f_1(t)$, $\mu_j$ the first moment of the j-th lifetime distribution $f_j(t)$, $\sigma j$ the second moment of the j-th lifetime distribution $f_j(t)$ and s the Laplace variable, wherein the failure rate $\lambda(t)$ is calculated by Laplace inverse transformation.

5. The method of claim 4, wherein the failure rate $\lambda(t)$ is approximated according to the following relation:

$$\lambda(t) \cong \frac{1}{\mu} + \frac{\Delta\mu}{\mu^3}\cdot t - \frac{\Delta\mu}{\mu^2}\left(\frac{\mu_1}{\mu} - \frac{3}{2}\left(1 + \frac{\sigma^2}{\mu^2}\right)\right) + \frac{\Delta\sigma^2}{2\mu^3}$$

wherein the first moments $\mu j$ and the second moments $\sigma j$ of the lifetime distributions vary approximately linearly with time, $\mu_1$ is the first moment of the first lifetime distribution $f_1(t)$, $\mu$ is the first moment of an additional lifetime distribution $f_{j-1}(t)$, $\Delta\mu$ is the difference between the first moments of two successive lifetime distributions $f_{j-1}(t)$ and $f_j(t)$, $\sigma$ is the second moment of the additional lifetime distribution $f_{j-1}(t)$, and $\Delta\sigma^2$ is the difference between the squares of two second moments $\sigma_{j-1}$ and $\sigma_j$ of two successive lifetime distributions $f_{j-1}(t)$ and $f_j(t)$.

6. The method of claim 1 or 4, wherein said technical devices comprise vehicles of any type.

* * * * *

UNITED STATES PATENT AND TRADEMARK OFFICE

CERTIFICATE OF CORRECTION

PATENT NO. : 6,085,154

DATED : July 4, 2000

INVENTOR(S) : Leuthausser et al.

It is certified that error appears in the above-indentified patent and that said Letters Patent is hereby corrected as shown below:

On the Cover:

[75] Inventors: "Leuthausser," should read -- Leuthaüsser, --; and "Jurgen" should read
-- Jürgen --
[73] Assignee: "beschrankter" should read
-- beschränkter --

In the Claims:

Column 11, line 28: "G(t);" should read -- G(t), --
Column 12, line 27: " j" should read -- $_j$ --
Column 12, line 38: "μj" should read -- $\mu_j$ --

In the Specification:

Column 5, line 8: " $_=$ϕ(t)" should read -- $_{\mu=}$ϕ(t) --
Column 9, line 55: " $_{i+}$" should read -- $_{i+1}$ --
Column 9, line 59: "5" should be deleted
Column 10, line 15: "trans-formation" should read -- transformation --

Signed and Sealed this

Eighth Day of May, 2001

Attest:

NICHOLAS P. GODICI

*Attesting Officer* — *Acting Director of the United States Patent and Trademark Office*